(12) United States Patent
Van Dyke

(10) Patent No.: US 7,047,947 B2
(45) Date of Patent: May 23, 2006

(54) LPG VEHICULAR LIQUID TRANSFER SYSTEM

(75) Inventor: Victor Van Dyke, Wayzata, MN (US)

(73) Assignee: Bi-Phase Technologies, LLC, Eagan, MN (US)

( * ) Notice: Subject to any disclaimer, the term of this patent is extended or adjusted under 35 U.S.C. 154(b) by 0 days.

(21) Appl. No.: 10/926,872

(22) Filed: Aug. 26, 2004

(65) Prior Publication Data

US 2006/0042606 A1   Mar. 2, 2006

(51) Int. Cl.
*F02M 37/04*   (2006.01)

(52) U.S. Cl. .................. 123/509; 123/527; 137/265
(58) Field of Classification Search ............ 123/527, 123/575, 468, 509; 137/265, 565.01; 417/36; 220/562–564, 565

See application file for complete search history.

(56) References Cited

U.S. PATENT DOCUMENTS

| 5,291,869 | A |   | 3/1994  | Bennett |
|-----------|---|---|---------|---------|
| 5,325,838 | A |   | 7/1994  | Bennett |
| 5,423,303 | A |   | 6/1995  | Bennett |
| 5,816,224 | A | * | 10/1998 | Welsh et al. ............ 123/525 |
| 6,216,675 | B1|   | 4/2001  | Bennett |
| 6,227,173 | B1|   | 5/2001  | Bennett |
| 6,588,406 | B1| * | 7/2003  | Oprea ................... 123/525 |

\* cited by examiner

*Primary Examiner*—Tony M. Argenbright
*Assistant Examiner*—Katrina Harris
(74) *Attorney, Agent, or Firm*—Merchant & Gould P.C.

(57) ABSTRACT

A fuel system for supplying LPG fuel, the system including a fuel storage tank and a fuel transfer tank. A first pump pushes fuel to a vehicle engine from the transfer tank and excess fuel from the engine is returned to the storage tank or the transfer tank. A second pump pulls fuel from the storage tank into the transfer tank when a fluid level within the transfer tank falls below a certain level. A method of providing LPG fuel to the engine of a vehicle.

10 Claims, 2 Drawing Sheets

LPG VEHICULAR LIQUID TRANSFER SYSTEM

BACKGROUND

Motor vehicles powered by internal combustion engines are commonly used to transport and deliver goods in many places in the world. In a number of these locales, environmental and other concerns have increased the use of motor fuels considered to be alternative fuels, as compared with the more expected gasoline and diesel fuels often used. One of the more popular alternative fuels is liquefied petroleum gas or LPG. LPG is a catchall term used to describe a variety of fuels such as commercial propane, butane which have similar physical qualities of being liquid when confined at near room temperature when moderately compressed. When in liquid form, these fuels are up to two hundred and fifty times more dense as compared to their gaseous form. Thus, it is preferable for fuel systems of LPG powered vehicles store the fuel in a liquid form until the fuel is supplied by an injector into a combustion chamber of an engine, at which point the fuel may be vaporized to improve combustion. Further, when using LPG in an engine with fuel injection, provision should be made for excess fuel from the injector rail to be returned to the fuel tank.

While many LPG fueled vehicles are factory conversions or retrofits of vehicles designed to use more traditional fuels, such as gasoline or diesel, the location of the tanks, pumps and other equipment used for the more traditional fuels are not the most well suited for LPG fuel systems. Maintenance and repair considerations vary between the more traditional fuel systems and LPG systems.

Improvements to the known systems for storing liquid LPG and supplying gaseous LPG to the engine are desirable.

SUMMARY

The present invention relates generally to an LPG fuel supply system and method of supplying LPG fuel to the engine of a vehicle.

More specifically, the present invention relates to an LPG fuel system for use on a vehicle using LPG to fuel an internal combustion engine, including a storage tank and a transfer tank, each tank configured to contain liquid and gaseous LPG. A fuel supply pump is mounted within the transfer tank and configured to push fuel from the transfer tank through a first fitting to the engine. The system also includes a second fitting with a biased three-way connection. A first end of the three way fitting is connected to an engine fuel return line, a second end is connected to the storage tank, and a third end is connected to the transfer tank. The three-way connection is biased to permit flow of excess fuel from the engine to the storage tank until the storage tank reaches a first specified volume of liquid LPG, and then to permit flow of excess fuel from the engine into the transfer tank.

The transfer tank also includes a transfer pump for pulling fuel from the storage tank into the transfer tank through a third fitting on the transfer tank. The transfer pump is configured to shut off when a second specified volume of liquid LPG is in the transfer tank.

The present invention further relates to a fuel transfer system for a motorized vehicle with an internal combustion engine using LPG for fuel, including a transfer tank with first, second and third fittings extending through a tank wall, a fuel supply pump and a fuel transfer pump. The fuel supply pump is connected to the first fitting and configured to provide fuel through the first fitting to the engine of the vehicle. The fuel transfer pump is connected to the second fitting and configured to pull fuel from a supply tank into the transfer tank through the second fitting when the level of fuel within the transfer tank drops below a specified volume. The third fitting is connected to a fuel return line from the engine to receive excess fuel from the engine and includes a biased three-way connector. The three-way connector is biased to direct excess fuel from the engine to the supply tank until the fuel level on the supply tank reaches a specified volume and then direct the excess fuel into the transfer tank through the third fitting.

The present invention also relates to a method of providing LPG fuel to an engine of a motorized vehicle. The method includes providing a storage tank and a transfer tank configured to contain liquid and gaseous LPG fuel, the transfer tank including a fuel transfer pump and a fuel supply pump. The fuel supply pump is operated to push LPG to a fuel delivery system of the engine of the motor vehicle. Excess fuel from the fuel delivery system of the engine is received in a biased valve hydraulically connected with the fuel delivery system, the fuel storage tank and the fuel transfer tank. The biased valve is configured to allow excess fuel to flow from the fuel delivery system into the fuel storage tank until an amount of LPG in the fuel storage tank reaches a first specified volume of liquid LPG and then directs the excess fuel into the fuel transfer tank. The fuel transfer pump is operated to pull LPG from the storage tank into the transfer tank until an amount of LPG in the fuel transfer tank reaches a second specified volume of liquid LPG, and is then shut off. Operation of the fuel transfer pump is resumed when the amount of LPG in the fuel transfer tank drops below the second specified volume of liquid LPG.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Internal combustion engines in most late model vehicles include a fuel injection delivery system as opposed to a carbureted fuel delivery system to delivery fuel from a fuel source such as an on-board fuel tank to the cylinders of the engine for combustion. Fuel injection systems generally provide pressurized fuel in a fuel rail behind one or more fuel injectors. At an appropriate time during the rotation of the engine, each of the fuel injectors is opened to allow fuel to flow into the intake manifold or into the cylinder. To promote more consistency in the amount of fuel injected at any given time, it is desirable that the fuel rail be maintained at a relatively constant pressure. To aid in this, a fuel return is provided to allow excess pressure and fuel to be bled out of the fuel rail and returned to the fuel source for reuse. Such systems are well-known in the industry.

Figure 1:
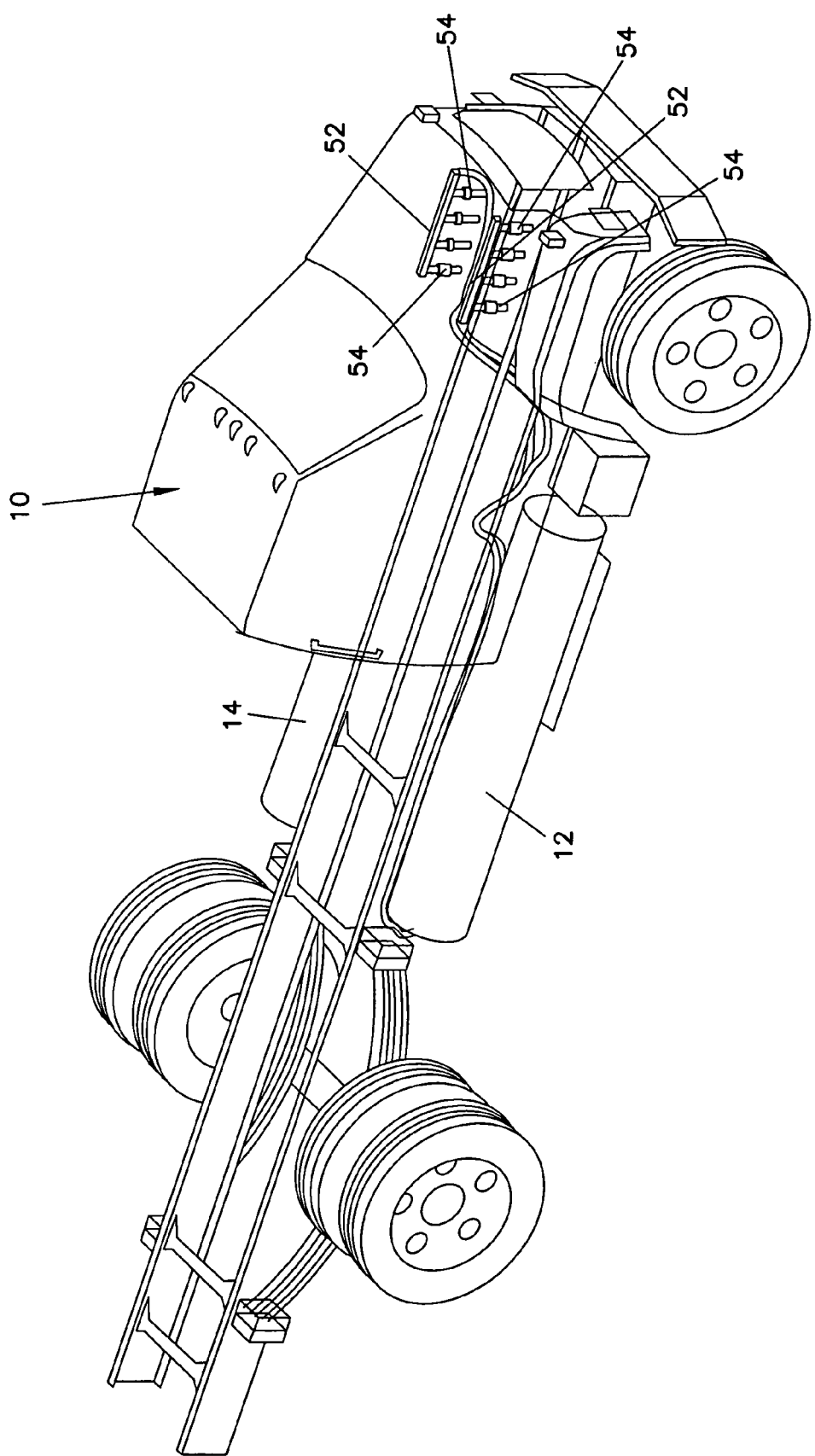
FIG. 1 is a schematic diagram of a motor vehicle with an LPG fuel delivery system according to the present invention.

Most motor vehicles powered by an internal combustion engine 16, such as vehicle 10 of FIG. 1, are powered by gasoline or diesel fuel. However, it is sometimes desirable for environmental concerns, conservation, or other business reasons to provide alternative fuel sources for such vehicles. One of the known fuel sources that can be adapted for use in existing internal combustion engines is LPG. LPG, as noted above, is desirable as it transitions from gas to liquid at relatively high temperatures and low pressures. Such a transition point allows for storage of fuel in a liquid form (at much greater density than possible with gaseous LPG) and injection into an engine in gaseous form (more efficiently burned than liquid LPG). LPG is also desirable in that in contains approximately the same energy content in liquid form as does gasoline, so that LPG can be used in a gasoline engine without alteration to the electronics controlling the delivery of fuel and ignition of fuel in the cylinders. Another advantage of LPG as an alternative fuel is that gasoline engines can generally use LPG without requiring mechanical modifications, other than to the fuel storage and delivery system.

Conversion of existing trucks for use with LPG may be accomplished in the factory by the original manufacturer, by a third party or by the end customer. Whoever performs the conversion, it is desirable that the extent of physical modifications to the vehicle be kept to a minimum. It is desirable for a vehicle 10, such as shown in FIG. 1, that an LPG storage tank 12 be mounted in a location consistent with the location of the original gas or diesel fuel tank, such as the saddle tank location shown. While it is known to utilize a single tank for storage and transfer of LPG to an engine for combustion, such an arrangement requires the storage tank be configured with fuel pumps for transferring fuel to the fuel distribution system of the engine. In conjunction with storage tank 12, a second, or transfer tank 14 may also be mounted to vehicle 10. If vehicle 10 included a second original fuel tank in the location where tank 14 is indicated, tank 14 may be mounted in the original tank's location. Alternatively, if vehicle 10 was not originally configured with dual tanks, one of tanks 12 or 14 may be mounted in the original tanks position with the other tank mounted in a convenient and safe location on vehicle 10.

Figure 2:
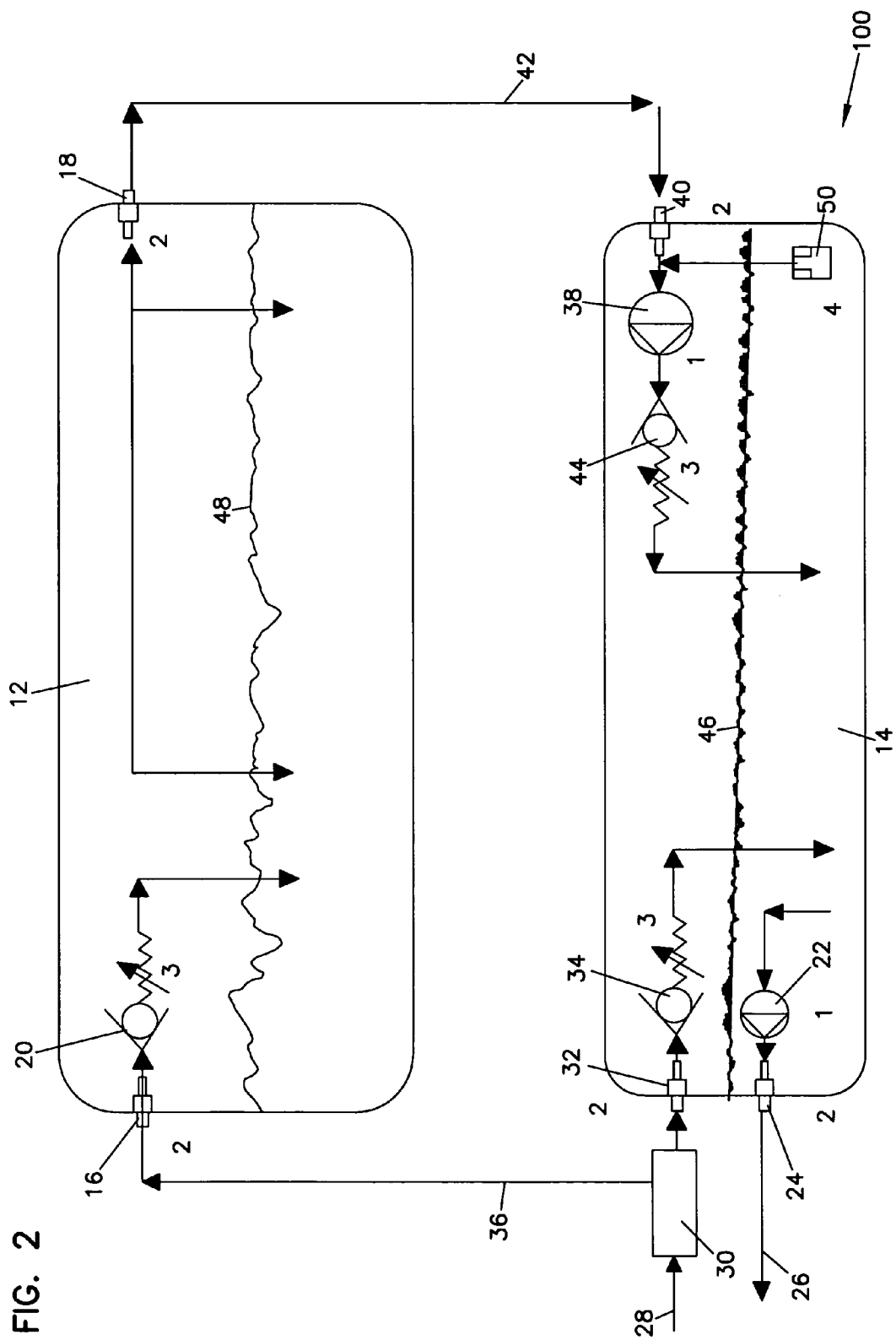
FIG. 2 is a schematic view of the fuel storage and transfer tanks for the LPG fuel delivery system of FIG. 1.

Referring now to FIG. 2, a schematic diagram of an LPG fuel system 100 including storage tank 12 and transfer tank 14. Tank 12 is the primary fuel storage tank of system 100 and is configured with a fuel inlet 16 and a fuel outlet 18. Although inlet 16 and outlet 18 are shown diagrammatically on opposite sides of tank 12, the inlet and outlet could be located adjacent each other or in some other configuration. Inlet 16 includes a shut off valve 20 which will prevent flow of fuel into tank 12 when tank 12 is at an eighty percent capacity liquid level, as indicated by liquid level 48. Outlet 18 of tank 12 is connected by a fuel transfer line 42 to an inlet 40 of tank 14.

Tank 14 is the fuel transfer tank of system 100 and includes an engine fuel supply pump 22 connected to a fuel outlet 24. An engine supply fuel line 26 extends from outlet 24 to a fuel rail 52 and a plurality of fuel injectors 54 connected to fuel rail 52. An engine fuel return line 28 returns unused fuel from fuel rail 52 to a three-way valve 30. Valve 30 directs fuel returned from fuel rail 52 to tank 12 through a second fuel return line 36 as long as valve 20 of inlet 16 permit fuel to flow into tank 12. If liquid level 48 of tank 12 reaches the eighty percent maximum liquid capacity of tank 12, shut off valve 20 closes and three way valve 30 directs fuel to tank 14 instead. Fuel flowing from engine fuel return line 28 through valve 30 enters tank 14 through a fuel return inlet 32. Inlet 32 includes a shut off valve 34 which is configured to close and prevent entry of fuel into tank 14 if a liquid level 46 within tank 14 reaches an eighty percent capacity liquid level.

Having the normal path for fuel returning from fuel rail 52 flow into tank 12 aids the supply of liquid fuel to fuel rail 52 from tank 14. Fuel returning from fuel rail 52 will likely have been exposed to higher-than-ambient temperatures as the fuel passed through engine supply line 26 and returned in engine fuel return line 28, especially where lines 26 and 28 are routed within an engine compartment of vehicle 10 or adjacent other heat generating devices or components of vehicle 10. If this higher temperature fuel were returned normally to tank 14, the overall heat and vapor pressure within tank 14 would be elevated. This is not desirable as it is most efficient to supply cooler, denser liquid fuel to fuel rails 52. Directing this higher temperature return fuel to tank 12 helps maintain a lower temperature in tank 14.

Tank 14 also includes a fuel transfer pump 38 which is connected to and receives fuel through inlet 40 from tank 12 through transfer line 42. Pump 38 is fluidly connected to a shut off valve 44 which will close and prevent additional liquid from entering tank 14 if liquid level 46 reaches an eighty percent capacity liquid level. Pump 38 is also connected to a calibrated orifice 50 which is submerged beneath liquid level 46. To pull fuel from tank 12 into tank 14, pump 38 creates a vacuum within transfer line 42. This vacuum will begin to draw fuel from tank 12 to tank 14 but the reduction in pressure within line 42 (created by the vacuum) may tend to cause the liquid fuel to vaporize and for gaseous fuel to be transferred instead. It is much less efficient to pump the fuel in a gaseous form as opposed to pumping it in a liquid form. However, this vaporization will also draw some heat from the fuel and this reduction of temperature of the fuel will aid in the transfer of liquid as opposed to gaseous fuel. After a given time of operation, pump 38 will have drawn enough fuel from tank 12 to fill transfer line 42 with liquid fuel and provide efficient pumping of fuel between tanks 12 and 14.

Calibrated orifice 50 provides an opening beneath liquid level 46 and permits pump 38 to draw liquid fuel from within tank 14 into transfer line 42 upstream of pump 38. One of the purposes of orifice 50 is to decrease the amount of time pump 38 has to operate to begin transferring liquid as opposed to gaseous fuel from tank 12. The amount of fuel drawn from tank 14 is determined by the size of opening of orifice 50. The liquid fuel drawn to pump 38 from within tank 14 serves to prime pump 38 to create a better vacuum and pumping condition. The flow of liquid fuel through pump 38 from orifice 50 may also aid in keeping pump 38 cooler during operation until liquid fuel from tank 12 arrives through transfer line 42 to pump 38. Once liquid fuel has filled transfer line 42 and liquid from tank 12 has reached pump 38, the amount of liquid fuel draw to pump 38 through orifice 50 will be reduced.

Transfer pump 38 and supply pump 22 are shown mounted on opposite ends of tank 14 for clarity in FIG. 2. However, it may be preferable that these two pumps are mounted adjacent to each other with tank 14 so that they may be accessible through a single access port in tank 14. Such an arrangement of pumps 22 and 38 may also include a clustering of inlets 32 and 40 with outlet 24 adjacent the pumps. These two pumps may also be enclosed with a single housing. It is preferable that both pumps 22 and 38 be mounted so that liquid level 46 is above the pumps as much as possible, so that the pumps may utilize the fuel within tank 14 to aid in cooling the pumps during operation.

Power needs to be supplied to each of the pumps 22 and 38 for their operation as described above. Because of the circular nature of fuel flow that the two pumps may develop when operating simultaneously (e.g., pump 22 draws fuel from tank 14 to deliver to the engine, excess fuel from the engine fuel supply is returned to tank 12 and pump 38 transfers fuel from tank 12 to maintain an appropriate level of fuel within tank 14), it is preferable that the two pumps be supplied with power through a common switched power source. Such a power source might be controlled by the electronic control unit (ECU) operating the timing and operation of vehicle 10's engine. It is common for the ECU to supply power to a fuel pump supplying fuel to an engine when an ignition switch of the vehicle is turned on. For vehicle 10, it would be preferable for the ECU to supply power to each of the pumps 22 and 38 when the ignition switch is turned on. Operation of the shut off valves 34 and 44 may cause pump 38 to stop operating while the ignition is on. However, this would be to address a temporary condition based on fuel level 46 within tank 14. When the fuel level 46 is below eighty percent of capacity of tank 14, pump 38 will operate to transfer fuel from tank 12 to tank 14 when the ignition is on. Pump 22 would continue to operate to provide fuel to fuel rails 52 as long as the ignition is on. Providing power to a single circuit or wiring harness powering both pumps is preferable and such a power circuit may be simpler to construct and maintain with the two pumps 22 and 38 preferably mounted within the same housing.

Mounting both pump 22 and pump 38 within transfer tank 14 requires that less hardware and electronics to be installed within tank 12 or attached to tank 12. This arrangement permits easy replacement of tank 12 and utilization of standard or known LPG storage or fuel tanks as part of LPG fuel system 100. This is advantageous as it permits interchange or use of LPG tanks between vehicle 10 and other LPG powered vehicles such as forklifts or other industrial vehicles. Many of these vehicles do not utilize a transfer tank but rather use the natural vapor pressure of LPG and a pressure regulator to provide gaseous LPG to a carburetor for combustion. Utilization of these existing tanks which may not include any fuel supply or transfer pumps 22 and 38 may reduce the cost of components required for conversion of a vehicle to operation with LPG. Known vehicles such as fork lifts and other industrial vehicles often replace an empty LPG tank with a new, fully charged tank, rather than filling the empty tank while the empty tank is mounted to the vehicle. The empty tank can then be sent to an LPG charging location and refilled with fuel while away from the vehicle. Fuel system 100 may be adapted to utilize similar removable, replaceable and/or rechargeable tanks.

FIG. 1 shows tanks 12 and 14 mounted in saddle positions on opposite sides of vehicle 10. Alternatively, tanks 12 and 14 could be mounted adjacent one another on the same side of vehicle 10, or in other locations on vehicle 10. Tanks 12 and 14 are illustrated as generally similar in diameter and may also be generally the same overall length and volume. Alternatively, tank 12 could be a larger storage tank positioned as shown in FIG. 1, and tank 14 could be smaller in volume or differently shaped and positioned closer to fuel rails 52. It is also anticipated that more than one storage tank 12 might be included in an LPG fuel system 100 so that one of the ranks 12 could be removed and replaced without halting supply of fuel to fuel rails 52 and fuel injectors 54.

As shown in FIG. 2, the addition of a transfer tank 14 with LPG storage tank 12 for supplying LPG fuel to an engine permits storage tank 12 to only include an inlet opening 16 and an outlet opening 18. LPG tanks are typically limited in liquid capacity to no more than eighty percent of total volume, so that fluid and gas within the tank have sufficient room to expand and contract due to differences in atmospheric temperature and pressure. A shutoff valve 20 is included adjacent inlet opening 16 of tank 12 and operates to shutoff entry of additional LPG into tank 12 once eighty percent fluid capacity of tank 12 has been reached.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. An LPG fuel system for use on a vehicle using LPG to fuel an internal combustion engine, the fuel system comprising:
    a storage tank and a transfer tank, each tank configured to contain liquid and gaseous LPG;
    a fuel supply pump within the transfer tank configured to push fuel from the transfer tank through a first fitting in the transfer tank to the engine;
    a second fitting with a biased three way connection, with a first end of the three way fitting connected to an engine fuel return line, a second end connected to the storage tank, and a third end connected to the transfer tank, the three way connection biased to permit flow of excess fuel from the engine to the storage tank until the storage tank reaches a first specified volume of liquid LPG, and then to permit flow of excess fuel from the engine into the transfer tank;
    the transfer tank including a transfer pump for pulling fuel from the storage tank into the transfer tank through a third fitting on the transfer tank, the transfer pump configured to shut off when a second specified volume of liquid LPG is in the transfer tank.

2. The LPG fuel system of claim 1, wherein the first specified volume of liquid LPG in the storage tank is approximately eighty percent liquid.

3. The LPG fuel system of claim 1, wherein the second specified volume of liquid LPG in the transfer tank is approximately eighty percent liquid.

4. The LPG fuel system of claim 1, wherein the fuel supply pump is electrically linked with the fuel transfer pump to operate simultaneously with the fuel supply pump until the volume of liquid LPG in the transfer tank reaches the second specified volume, pause operation when the LPG level is at or above the second specified volume and resume operation if the level of LPG in the transfer tank drops below the second specified volume.

5. The LPG fuel system of claim 1, wherein the transfer pump is fluidly connected to the storage tank and the fluid connection includes a calibrated orifice which is submerged beneath a level of LPG in the transfer tank.

6. A fuel transfer system for a motorized vehicle with an internal combustion engine using LPG for fuel, the fuel transfer system comprising:

a transfer tank with first, second and third fittings extending through a tank wall, a fuel supply pump and a fuel transfer pump;

the fuel supply pump connected to the first fitting and configured to provide fuel through the first fitting to the engine of the vehicle;

the fuel transfer pump connected to the second fitting and configured to pull fuel from a supply tank into the transfer tank through the second fitting when the level of fuel within the transfer tank drops below a first specified volume of liquid;

the third fitting connected to a fuel return line from the engine to receive excess fuel from the engine and including a biased three way connector, the three way connector biased to direct excess fuel from the engine to the supply tank until the fuel level on the supply tank reaches a second specified volume of liquid and then direct the excess fuel into the transfer tank through the third fitting.

7. The LPG fuel system of claim 6, wherein the second specified volume of liquid in the storage tank is approximately eighty percent liquid.

8. The LPG fuel system of claim 6, wherein the fuel transfer pump is fluidly connected to the storage tank and the fluid connection includes a calibrated orifice which is submerged beneath a level of LPG in the transfer tank.

9. The LPG fuel system of claim 6, wherein the first specified volume of liquid in the transfer tank is approximately eighty percent liquid.

10. A method of providing LPG fuel to an engine of a motorized vehicle, the method comprising:

providing a storage tank and a transfer tank configured to contain liquid and gaseous LPG fuel, the transfer tank including a fuel transfer pump and a fuel supply pump;

operating the fuel supply pump to push LPG to a fuel delivery system of the engine of the motor vehicle;

receiving excess fuel from the fuel delivery system of the engine in a biased valve hydraulically connected with the fuel delivery system, the fuel storage tank and the fuel transfer tank, the biased valve configured to allow excess fuel to flow from the fuel delivery system into the fuel storage tank until an amount of LPG in the fuel storage tank reaches a first specified volume of liquid LPG and then directing the excess fuel into the fuel transfer tank;

operating the fuel transfer pump to pull LPG from the storage tank into the transfer tank until an amount of LPG in the fuel transfer tank reaches a second specified volume of liquid LPG, then shutting off the fuel transfer pump;

resuming operation of the fuel transfer pump when the amount of LPG in the fuel transfer tank drops below the second specified volume of liquid LPG.

* * * * *